(No Model.) 2 Sheets—Sheet 1.
R. T. WHITE.
ROUTING MACHINE.
No. 249,133. Patented Nov. 1, 1881.
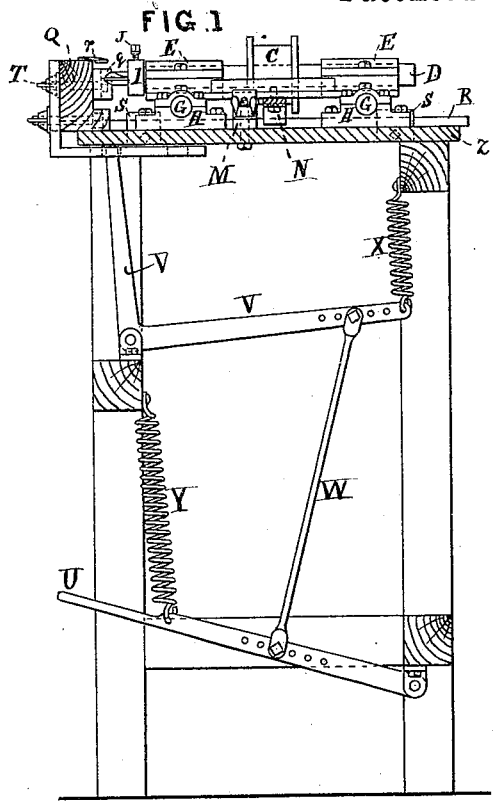
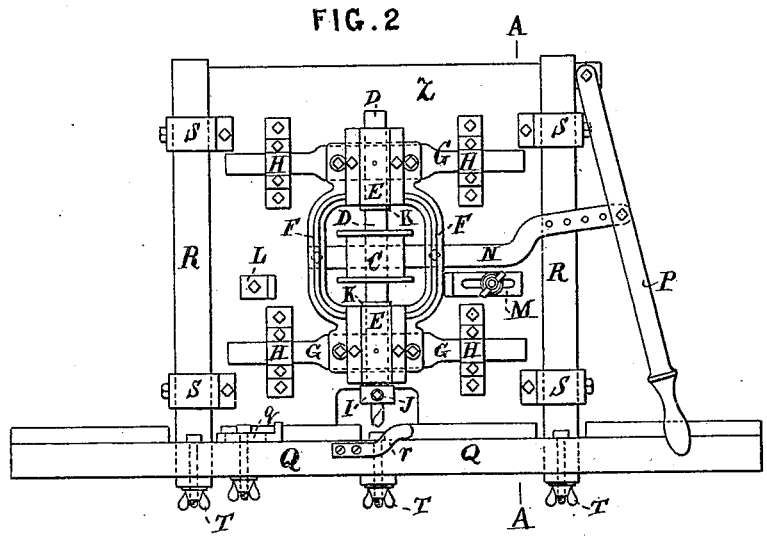
Witnesses
E. Planta
D. Renshaw.
Inventor
R. T. White
by J. H. Adams
Atty (No Model.) 2 Sheets—Sheet 2.

R. T. WHITE.
ROUTING MACHINE.

No. 249,133. Patented Nov. 1, 1881.

Witnesses
Inventor
R. T. White
by J. H. Adams
Att'y

UNITED STATES PATENT OFFICE.

REYNOLDS T. WHITE, OF BOSTON, ASSIGNOR OF ONE-HALF TO MARY A. WILDES, OF CAMBRIDGE, MASSACHUSETTS.

ROUTING-MACHINE.

SPECIFICATION forming part of Letters Patent No. 249,133, dated November 1, 1881.

Application filed August 22, 1881. (No model.)

*To all whom it may concern:*

Be it known that I, REYNOLDS T. WHITE, of Boston, in the county of Suffolk and State of Massachusetts, have invented a new and useful Improvement in Routing-Machines, of which the following is a specification.

My invention relates to an improvement in machines for cutting grooves or mortises in articles of wood; and the invention consists in the employment of a rotary cutter the spindle of which is supported in bearings which are capable of being moved by means of a handle to the right or left, as desired, the article in which the groove is to be made being placed on a table or support which is pressed toward the cutter by means of a treadle and levers, so that when the cutter has been bored to the requisite depth the article will be moved along and the groove of the required length be made without raising or removing the cutter from the groove or the article from the cutter.

Figure 3:
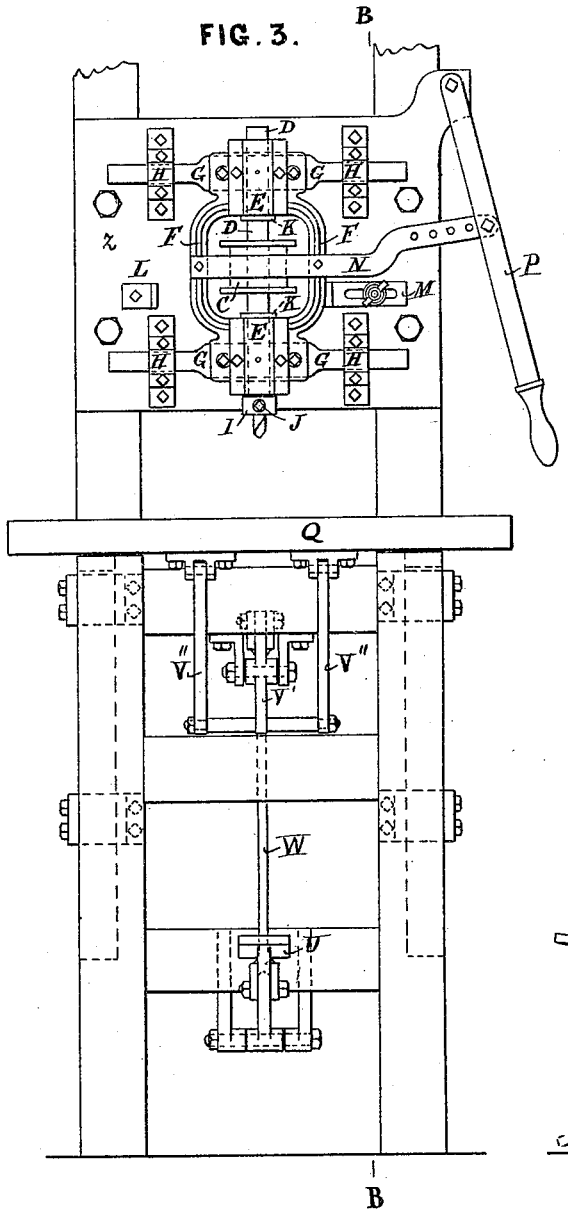
Figure 4:
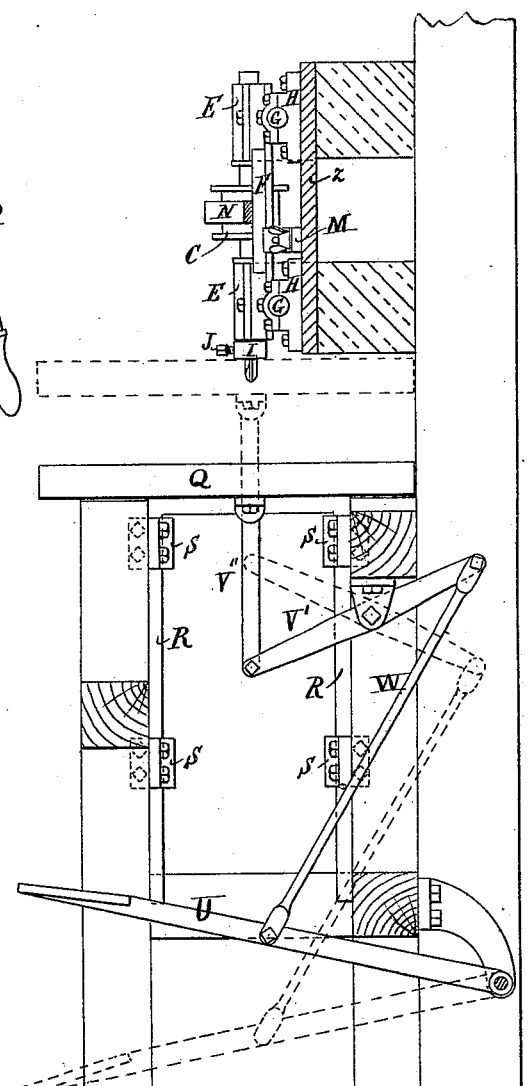

Referring to the accompanying drawings, Figure 1 represents a vertical transverse section of a machine in which the cutter is arranged in a horizontal position. Fig. 2 is a plan view of the same. Figs. 3 and 4 represent respectively a front elevation and vertical section of the machine with the cutter in a vertical position.

$e$ is a cutter secured to the spindle D, which has its bearings E in a movable frame, F, the latter being carried by the rods or bars G, which move in guides H, secured to the bed-plate $h$. The outer end of the cutter-spindle is provided with a boss, I, in which the cutter is firmly held by a screw, J. Collars K are also provided on the spindle-shaft D, to insure its working steady and without vibration.

L is a fixed stop, and M an adjustable stop, secured by thumb-screw for regulating the length of the slot to be cut.

N is an arm fixed to the frame F at one end, and connected to the hand-lever P at the other, by which lever the frame F is pushed from right to left so far as will be allowed by the stop L.

Q is a support for the stock, and is carried by the sliding bars R, which work in guides S. This support is made adjustable in a vertical position by means of thumb-screws T, and the article placed on it is fed toward the cutter by depressing the treadle U, which actuates the bell-crank lever V, the latter being connected to the support Q through rod W.

X is a spring for drawing up the end of the bell-crank lever when the foot is removed from the treadle U, thus drawing the feed-support Q back from the cutter. Y is a spring for drawing up the treadle when released.

The operation of the machine is as follows: The article to be grooved is placed on the support Q against the stop $q$, and held down in position by the spring $r$ on the support Q. The cutter is then caused to revolve by belting (not shown in the drawings) on pulley C. The treadle U is then depressed, thus feeding the work toward the cutter. When the desired depth has been attained the lever P is drawn over by hand, and the cutter thus forced along, cutting a groove until the frame F comes in contact with the stop L, when the lever P is released and the frame drawn back as far as the stop M by means of the driving-belting. At the same time the treadle U is released and drawn up, and the support Q forced from the cutter by the springs X and Y, when the article can be taken out and replaced by another, the same operation being repeated.

It will be seen that the operation of the vertical cutter, as shown in Figs. 3 and 4, is the same as that above described; but in the vertical arrangement the springs X Y are dispensed with, the weight of the table being sufficient to withdraw it from the cutter; and in place of the bell-crank lever V, I have shown a double-armed lever, V', connected at one end to the rod W, and at the other to the rods V'', which are connected to the support or table Q. The top of the support or table Q is provided with holes, in which pins can be inserted for holding irregular pieces of material to be grooved. I am also enabled to attach to the cutter-spindle a bit for cutting inside moldings, and also to attach a suitable die with cutters for cutting rosettes.

What I claim as my invention is—

1. In a routing-machine, the combination, with the frame F, supporting the rotating cutter-spindle, and carried by rods or bars G G, moving in guides H H, of the arm N and lever P, for the purpose of imparting a lateral movement to the cutter, substantially as specified.

2. In a routing-machine, the combination, with the adjustable support or table Q, carried by sliding bars R R, moving in guides S S, of the bell-crank lever V, rod W, and treadle U, whereby the work is fed toward the cutter, substantially as set forth.

3. In a routing-machine, the combination of the laterally-moving frame F, rotating cutter-spindle D, supported thereon in bearings E E, movable support or table Q, having stop $q$ and spring $r$, and suitable operating mechanism, substantially as and for the purpose shown and described.

In testimony whereof I have signed my name to this specification in the presence of two subscribing witnesses.

REYNOLDS T. WHITE.

Witnesses:
J. H. ADAMS,
E. PLANTA.